United States Patent [19]

Dammar

[11] E Re. 28,582

[45] Reissued Oct. 28, 1975

[54] LEAD FORMING METHOD

[75] Inventor: Raymon H. Dammar, Minneapolis, Minn.

[73] Assignee: Possis Corporation, Minneapolis, Minn.

[22] Filed: Aug. 11, 1972

[21] Appl. No.: 280,037

Related U.S. Patent Documents

Reissue of:

[64] Patent No.: 3,636,621
Issued: Jan. 25, 1972
Appl. No.: 794,832
Filed: Aug. 26, 1968

[62] Division of Ser. No. 565,291, July 14, 1966, Pat. No. 3,474,515.

[52] U.S. Cl. ..... 29/596; 29/205 R; 29/597; 29/598; 140/92.1; 242/7.03; 242/7.05 B; 310/234

[51] Int. Cl.[2] ..... H02K 15/00

[58] Field of Search ..... 29/596, 597, 598, 205 R, 29/205 CM; 140/92.1; 242/7.03, 7.05 B; 310/234

[56] References Cited

UNITED STATES PATENTS

| | | | |
|---|---|---|---|
| 3,169,301 | 2/1965 | Fletchen et al. | 29/205 X |
| 3,191,269 | 6/1965 | Moore | 29/598 |
| 3,212,170 | 10/1965 | Marshall | 29/598 |
| 3,309,548 | 3/1967 | Gough et al. | 310/234 |
| 3,395,448 | 8/1968 | Moore | 29/596 |
| 3,395,449 | 8/1968 | Moore | 29/596 |
| 3,448,311 | 6/1969 | Mommsen et al. | 310/234 |

FOREIGN PATENTS OR APPLICATIONS

| | | | |
|---|---|---|---|
| 121,253 | 4/1966 | Netherlands | 29/597 |

*Primary Examiner*—Carl E. Hall

[57] ABSTRACT

A method of attaching the leads of coils wound onto a slotted armature with the leads wrapped at least partially around the shaft of the armature and then connected to selected commutator hooks circumferentially spaced from the slots in which the coils are laid, which method is characterized by the fact that a pair of concentric sleeves shield the commutator to prevent engagement of the wire with the hooks during winding of the coils; and upon completion of a pair of simultaneously wound coils, rotation of the concentric sleeves both in unison and relative to one another, first in one direction and then the other, exposes the selected hooks and wraps the wire lead about them.

4 Claims, 31 Drawing Figures

INVENTOR.
RAYMON H. DAMMAR
BY
Burd, MacEachron, Braddock, Barty & Schwartz
ATTORNEYS

INVENTOR.
RAYMON H. DAMMAR

BY
Burd, MacEachron, Braddock, Bartz & Schwartz
ATTORNEYS

INVENTOR.
RAYMON H. DAMMAR

BY
Burd, MacEachron, Braddock,
Bartz & Schwartz
ATTORNEYS

INVENTOR.
RAYMON H. DAMMAR

BY
Burd, MacEachron, Braddock, Barty & Schwartz
ATTORNEYS

INVENTOR.
RAYMON H. DAMMAR
BY
Burd, MacEachron, Braddock, Bartz & Schwartz
ATTORNEYS

INVENTOR.
RAYMON H. DAMMAR

BY
Burd, MacEachron, Braddock, Barty & Schwartz
ATTORNEYS

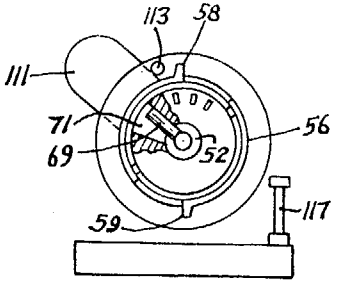
FIG. 23
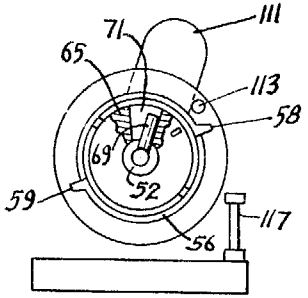
FIG. 24
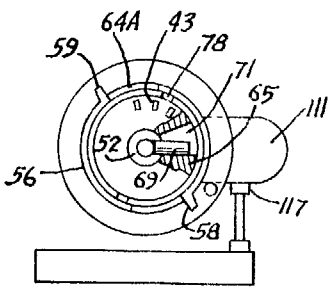
FIG. 25
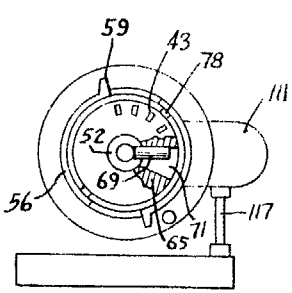
FIG. 26
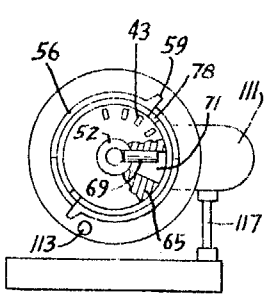
FIG. 27
FIG. 28
FIG. 29
FIG. 30
FIG. 31
INVENTOR.
RAYMON H. DAMMAR
BY
Burd, MacEachron, Braddock, Bartz & Schwartz
ATTORNEYS

LEAD FORMING METHOD

Matter enclosed in heavy brackets [ ] appears in the original patent but forms no part of this reissue specification; matter printed in italics indicates the additions made by reissue.

---

This application is a division of the copending application Ser. No. 565,291, filed July 14, 1966, now U.S. Pat. No. 3,474,515.

This invention relates to a method of attaching the leads of coils wound onto a slotted armature core, to the hooks or tangs of the commutator of the armature, and has as its purpose to expeditiously produce armatures that are free from objectionable crossover loops and undesirable bridging.

Briefly, the method of this invention contemplates shielding the commutator of the armature and, more especially, its lead-receiving hooks or tangs, in the mouth of a pair of concentric relatively rotatable sleeves during the winding of the coils to prevent engagement of the wire with the hooks or tangs, and then – at the completion of each coil and with the wire held against the outer sleeve—carrying the wire around the armature shaft by rotation of the outer sleeve to a point just beyond a selected commutator hook. At this point, the selected hook is exposed by relative rotation between the sleeves and the wire drops behind the selected hook. Now, by rotation of the sleeves in unison, but in the reverse direction, the wire is carried around the hook, whereupon relative rotation of the sleeves frees the wire from the concentric sleeves so that winding of the next coil can commence.

It is a feature of this invention that, during the attachment of the wire lead to a commutator hook, the armature is not rotated. The only rotation imparted to the armature is that required to index it for the winding of successive coils.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate one complete example of the physical embodiment of the invention constructed according to the best mode so far devised for the practical application of the principles thereof, and in which:

FIGS. 23 to 31 are diagrammatic views partly sectioned showing the sequential relationships between the driving control structure of the apparatus and the movable lead-carrying structure with respect to the lead receiving hook on the commutator.

Figures 1, 5:
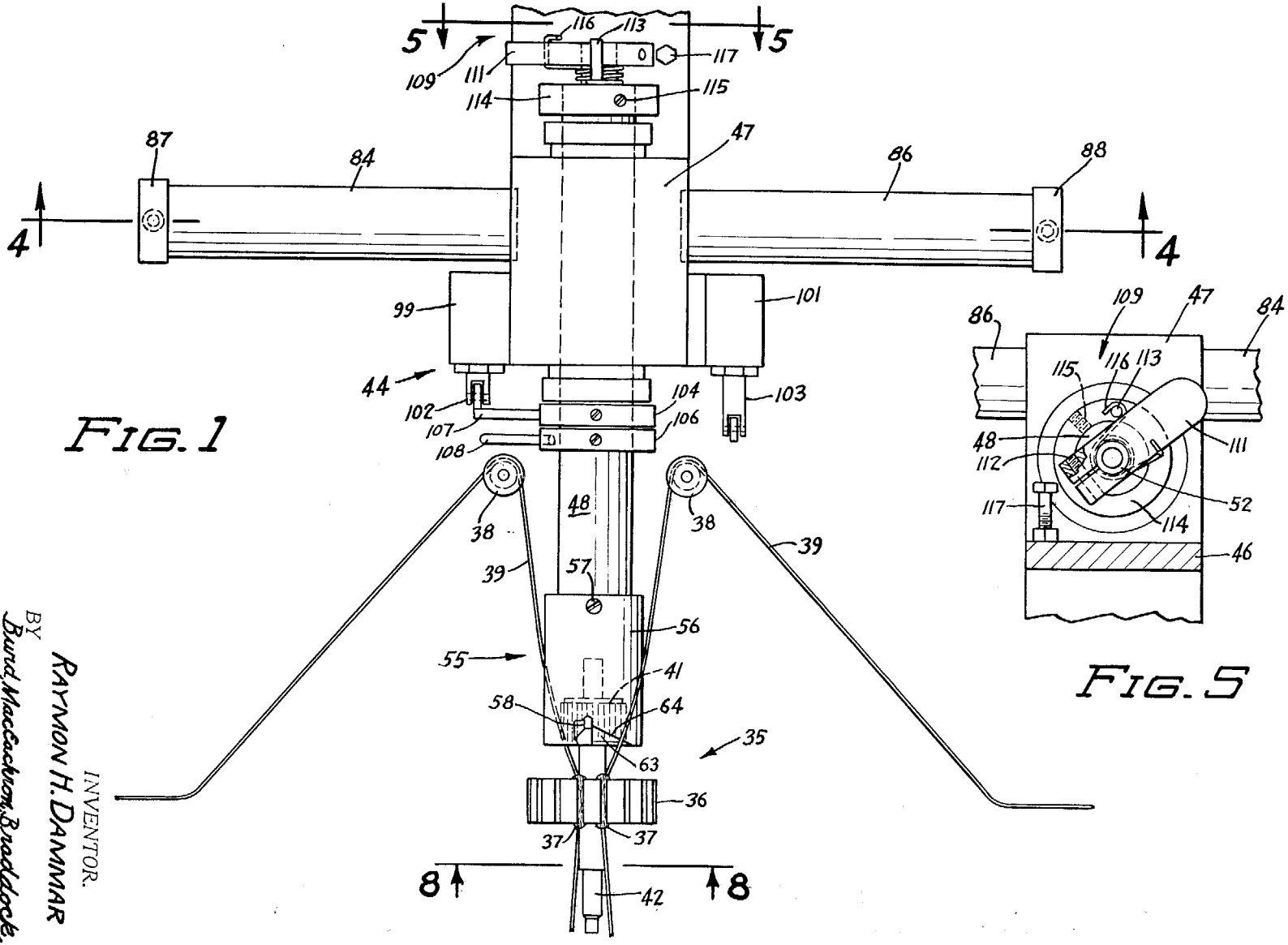
FIG. 1 is a plan view of an apparatus that can be employed to practice the method of this invention, illustrating an armature in position and being wound.
FIG. 5 is a sectional view taken along the line 5—5 of FIG. 1.

Referring to the drawings there is shown in FIG. 1, a rotor for an electrical machine indicated generally at 35 positioned in working relation with a lead-attaching apparatus indicated generally at 44. Rotor 35 has a soft iron armature core 36 formed with a plurality of circumferentially spaced longitudinal slots for receiving coils of wire 37 forming electrically effective coil loops. The coils of wire are wound or placed on armature core 36 by a winding machine (not shown) having movable fliers 38 for directing the wire leads 39 into pairs of slots in the armature core. Axially spaced from core 36 is a commutator 41 mounted on a shaft 42 carrying armature core 36. Commutator 41 has a plurality of circumferentially spaced conducting segments forming an outer cylindrical surface. Each segment of the core 36 has a hook or tang 43 turned upwardly and axially away from the core to receive and hold leads 39 extended from the slots.

Figures 2, 3:
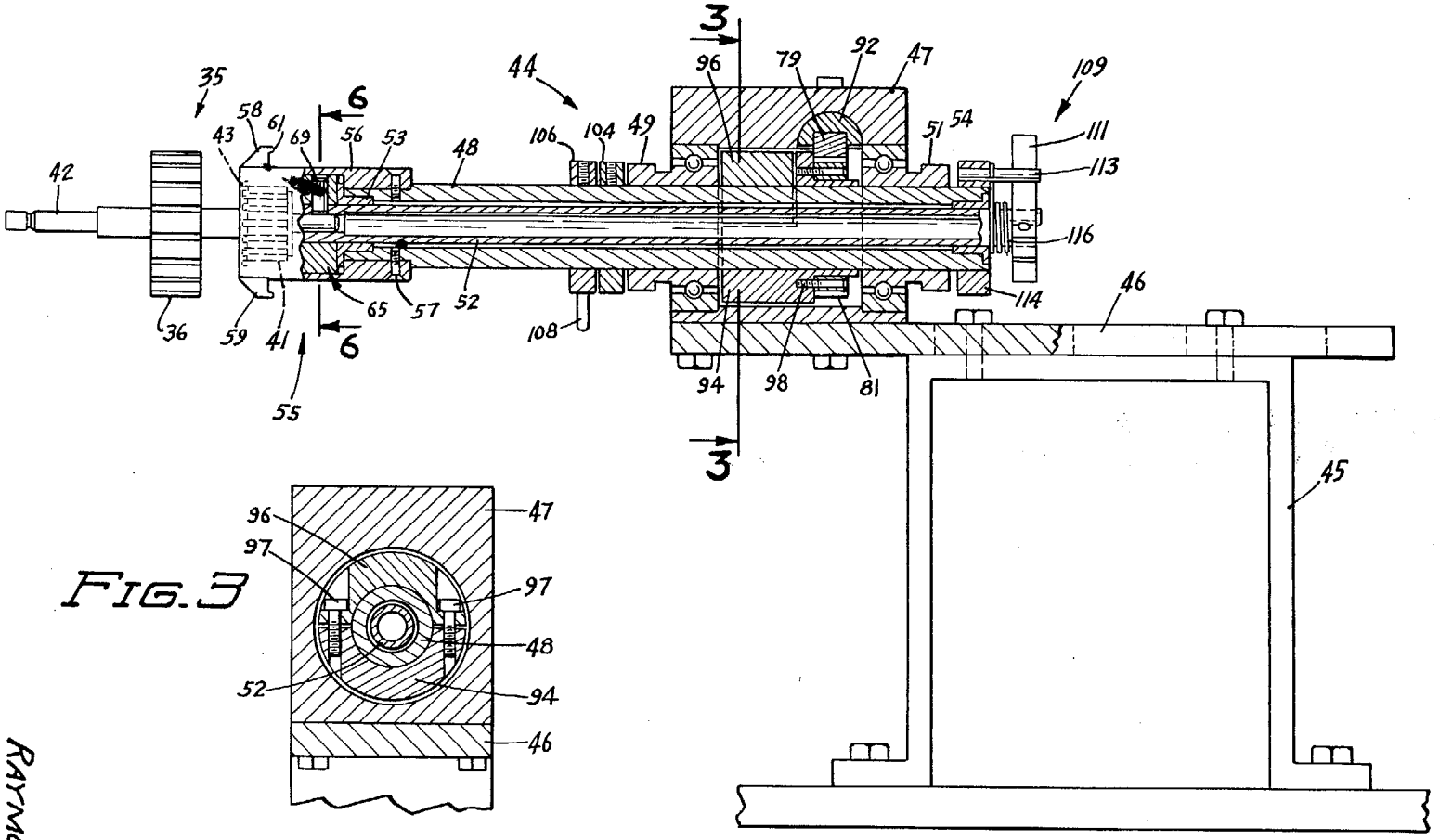
FIG. 2 is a side view of the apparatus shown in FIG. 1, partly in section.
FIG. 3 is a sectional view taken along the line 3—3 of FIG. 2.

The lead-attaching apparatus 44 operates in conjunction with the winding machine to carry the ending leads which extend from the slots around the shaft and onto commutator hooks that are circumferentially spaced from the slots from which the leads emanate, in a manner which eliminates crossover loops and bridging of successive leads. As shown in FIG. 2, the apparatus 44 has a flat frame or base plate 46 carrying a box shaped housing 47. Frame 46 has a plurality of elongated openings adapted to receive bolts used to secure the frame to a machine support 45 or the like. Housing 47 has a longitudinal bore accommodating an elongated outer tubular shaft 48. Ball bearing assemblies 49 and 51 rotatably mount shaft 48 in housing 47. Concentrically positioned within tubular shaft 48 is an inner shaft 52. Sleeve bearings 53 and 54 located in the opposite end portions of shaft 48 rotatably mount shaft 52 within tubular shaft 48.

Figure 10:
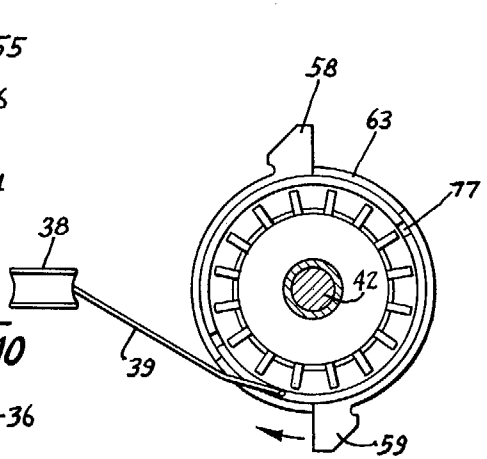
FIG. 10 is a sectional view taken along the line 10—10 of FIG. 9.
Figure 9:
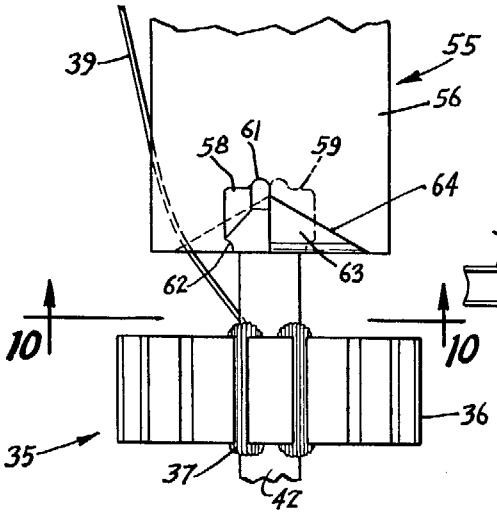
FIG. 9 is a fragmentary plan view of the structure shown in FIG. 8.
Figure 16:
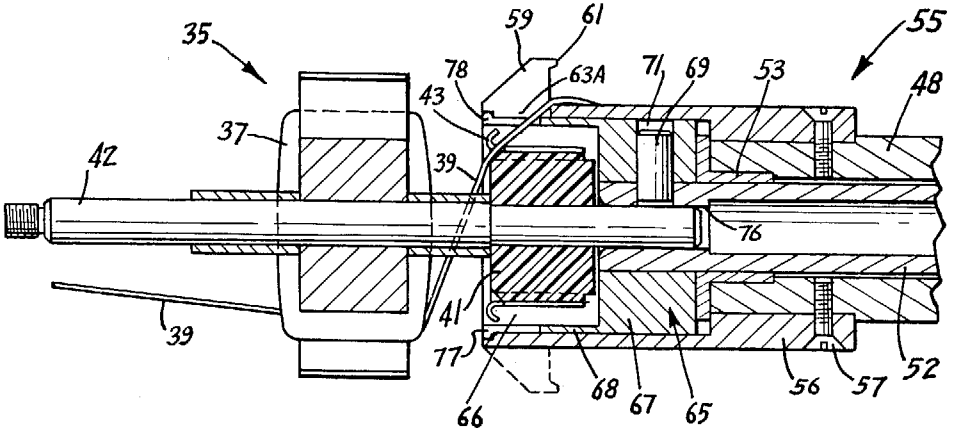
FIG. 16 is an enlarged sectional view taken along the line 16—16 of FIG. 14.

Mounted on the forward end of shafts 48 and 52 is a commutator shielding and lead moving and guiding unit 55 which is operable to move and guide each ending wire lead which extends from the coil just wound, about rotor shaft 42 and around a selected commutator hook while at the same time shielding the entire commutator except the selected hook to thereby prevent other or previously attached leads from leaving their hooks. As shown in FIG. 16, unit 55 comprises an outer sleeve or cup member 56 telescoped over and secured to the end of tubular shaft 48 by screws 57. Projected radially from the forward portion of sleeve 56 are two diametrically opposite lugs or fingers 58 and 59. These fingers are identical in construction as shown in FIGS. 9 and 10, and they have front or leading faces which lie in a common plane that contains the axis of the shafts 48 and 52. The opposite trailing and outward side faces of the lugs are each inclined and converge to flat heads having rearward projections 61. Axial recesses 62 are located in the bottom portions of the trailing faces. Located adjacent to the leading face of finger 58 is a triangular-shaped groove 63 having an inclined plowing edge 64. A similar triangular groove 63A is located adjacent to the leading face of finger 59 to provide a plowing edge 64A.

Concentrically disposed within sleeve 56 is an inner sleeve which provides a thimble or inner cup member indicated generally at 65, the cylindrical interior of which forms a chamber 66 for receiving and shielding the entire commutator 41. Cup member 65 has a base 67 and an outwardly projected cylindrical flange 68. Base 67 is drivably connected with the inner shaft 52 by a radially disposed pin 69 which has its inner end portion fixed in a hole in shaft 52 and its outer end portion received in an arcuate slot 71 in base 67. The arcuate length of the slot 71 provides the connection between the inner shaft 52 and the cup member 65 with about 20° of lost motion.

A frictional driving connection between the cup member 65 and the outer sleeve 56 is provided by a plurality of circumferentially spaced shoes 72 located in radial recesses 73 in base 67. Springs 74 positioned in recesses 73 bias the shoes radially outwardly into frictional engagement with the inner surface of outer sleeve 56.

As shown in FIG. 16, the forward end of inner shaft 52 has an axial bore 76 to receive the shaft 42 of an armature to be wound. Bore 76 axially aligns the armature core with the lead moving and guiding unit to insure the location of commutator 41 within the chamber 66.

The cylindrical flange 68 of the shielding cup or thimble has axial slots 77 and 78 which open to the outer end of member 65 and are normally covered by the outer sleeve 56. When uncovered by relative rotation of the inner and outer sleeves the slots 77 and 78 are located immediately adjacent the leading ends of the plowing edges 64 and 64A respectively, and when so uncovered, the slots 77 and 78 receive the wire leads and allow them to be engaged over and around the commutator hooks.

Figure 4:
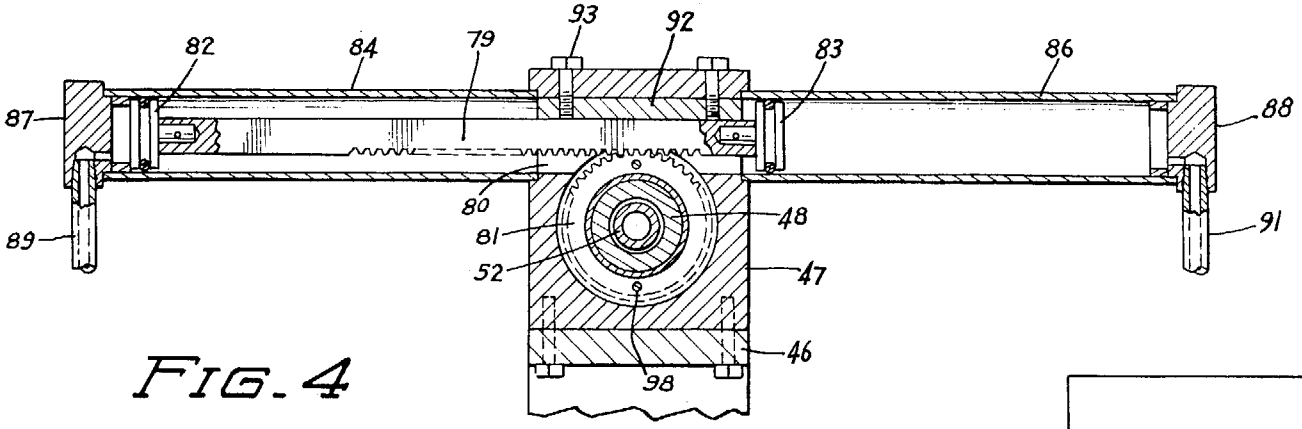
FIG. 4 is a sectional view taken along the line 4—4 of FIG. 1.

As shown in FIG. 4, the concentric shafts 48 and 52 are rotated by reciprocation of a rack 79 which meshes with a pinion gear 81 fixed with respect to the outer shaft 48. The rack extends transversely through an opening 80 in housing 47 and has its opposite ends secured to pistons 82 and 83 operative in cylinders 84 and 86 respectively. The inner ends of the cylinders are secured to housing 47 and close the opening 80. Caps 87 and 88 secured to the outer ends of the cylinders 84 and 86 are coupled to lines 89 and 91 used to supply pressure fluid, preferably air, to selectively drive the pistons toward housing 47. The top of rack 79 rides on a bearing plate 92 transversely positioned in housing 47 and secured to the top of housing 47 by bolts 93. As shown in FIG. 2, plate 92 has an elongated rectangular guideway for racks 79 and maintains the teeth of the rack in meshing engagement with the teeth of pinion gear 81.

As shown in FIGS. 2 and 3, a clamp unit comprising a sleeve portion 94 and a clamp portion 96 located in housing 47 is attached to outer shaft 48 by bolts 97. Sleeve portion 94 has a radial flange surrounding outer shaft 48 and accommodating bolts 98 securing pinion gear 81 to sleeve portion 94 so that on rotation of pinion gear 81 the outer shaft is rotated. Outer shaft 48 rotates approximately 180° as determined by a pair of limit switches 99 and 101 mounted on opposite sides of housing 47 as shown in FIG. 1. These switches have forwardly projected actuators 102 and 103 which control suitable valves (not shown) for directing the pressure fluid to cylinders 84 and 86 respectively. Actuators 102 and 103 are controlled by the angular positions of a pair of collars 104 and 106 adjustably mounted on outer shaft 48. The collars have radially directed arms 107 and 108 respectively which engage actuators 102 and 103 to determine the clockwise and counterclockwise stop positions of outer shaft 48.

Rotational movement of outer shaft 48 with respect to inner shaft 52 is regulated by a drive control indicated generally by 109 in FIGS. 1,2,5 and 7. Drive control 109 comprises a radial arm 111 having a bifurcated inner end clamped about the end of inner shaft 52 with a bolt 112. Arm 111 is engaged by a rearwardly projected pin 113 secured to a collar 114. A fastening means 115, as a setscrew, adjustably mounted collar 114 on outer shaft 48 to provide a positive drive connection between collar 114 and outer shaft 48. A coil spring 116 concentrically disposed about the rear end of inner shaft 52 provides a resilient driving connection between pin 113 and arm 111. Spring 116 has one end hooked over pin 113 and its opposite end hooked about the inner edge of arm 111 so as to resiliently urge arm 111 into engagement with pin 113.

Figure 7:
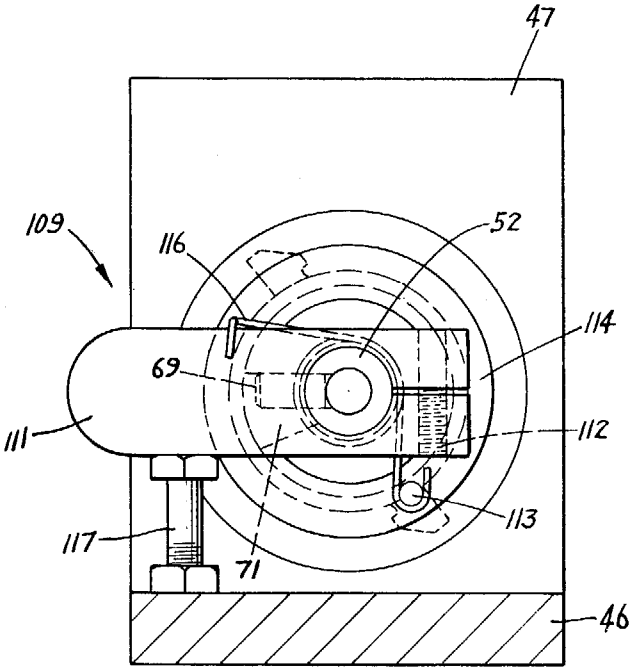
FIG. 7 is an enlarged view similar to FIG. 5 showing a detail of the drive control of the apparatus.

On rotation of outer shaft 48 in response to the application of fluid pressure to cylinder 84, the outer shaft 48 and inner shaft 52 rotate together by reason of the friction drive established by shoes 72. The rotating inner shaft 52 carries arm 111 toward and into engagement with an adjustable stop 117. As shown in FIG. 7, when arm 111 engages the stop 117 inner shaft 52 is prevented from further rotation, but the outer shaft 48 continues to rotate the inner cup member 65 an amount equal to the lost motion of pin 69 in angular slot 71. During this movement pin 113 moves away from arm 111 against the biasing force of spring 116.

On reversing the direction of the movement of rack 79 by applying fluid pressure to cylinder 86 the outer sleeve 48 rotates in a reverse direction moving pin 113 back into engagement with the arm 111. Spring 116 holds arm 111 into engagement with stop 117. Inner cup member 65 rotates with sleeve 56 until the lost motion provided by the slot 71 is taken up. At this time sleeve 56 rotates relative to cup member 65 overriding the friction drive of shoes 72 until pin 113 engages arm 111. Arm 111 is then carried back to its initial position by pin 113 allowing cup member 65 to be moved with sleeve 56 back to their starting positions.

In use, rotor 35 is held by the winding machine in an indexed position with its shaft 42 in bore 76 of the lead moving, guiding and shielding unit 55. The entire commutator 41 is positioned in cylindrical chamber 66 with the ends of its hooks 43 close to flange 68 to prevent applied leads from coming off the hooks and shielding the hooks from the wire as it is wound on core 36. Movable fliers 38 of the winding machine wind the wire leads 39 in separate pairs of core slots around core 36 to form the coils 37. As shown in FIG. 1, ending leads 39 from coils 37 extend from the core 36 adjacent to the top and bottom portions of outer sleeve 56. The following description is directed to the movement of the left lead 39 located under the sleeve 56 and engageable with finger 59. The opposite or right lead is moved and hooked in a similar manner and engages finger 58.

Figure 13:
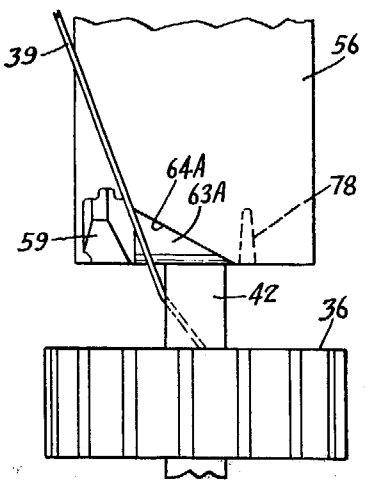
FIG. 13 is a top view of the structure shown in FIG. 12 taken along line 13—13.
Figure 12:
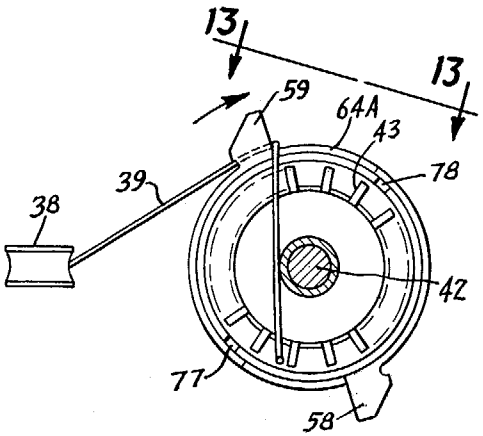
FIGS. 11 and 12 are sectional views similar to FIG. 10 to illustrate how rotation of the outer sleeve carries the wire lead around the shaft.
Figure 11:
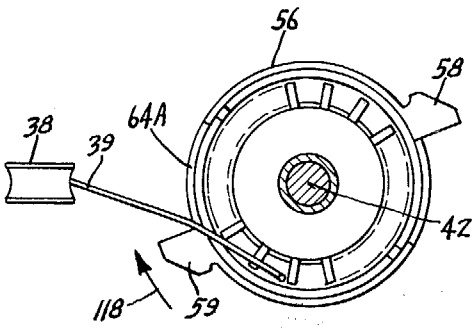
Figure 8:
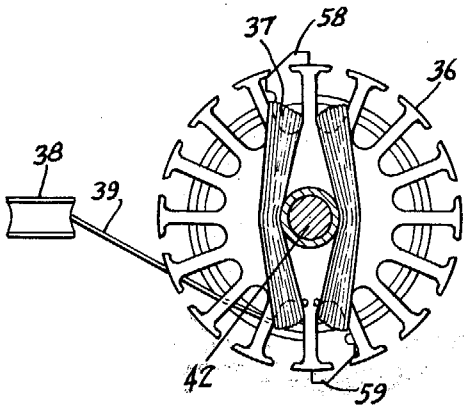
FIG. 8 is an enlarged sectional view taken along the line 8—8 of FIG. 1.

Referring to FIG. 8, 9 and 10, core 36 is in an indexed position with the coils 37 wound on the core in substantially vertical planes by movable fliers 38. Bottom lead 39 extends from coil 37 rearwardly around the flier pulley adjacent the bottom of sleeve 56 forwardly of finger 59. When coil 37 is completed the winding machine sends a signal which actuates a valve (not shown) to supply fluid under pressure to cylinder 84 driving piston 82 to the left as shown in FIG. 4. The consequent movement of rack 79 positively rotates outer shaft 48 and by virtue of the frictional driving connection, the inner shaft 52 is likewise turned. Since the sleeve 56 is fixed to the outer shaft, it too is positively rotated, and in so doing moves finger 59 into engagement with ending lead 39 carrying the lead in an upward direction as shown by arrow 118 in FIG. 11. As the sleeve 56 continues to rotate lead 39 falls into groove 63A in the outer edge of sleeve 56 adjacent the forward side of finger 59. As shown in FIGS. 12 and 13, lead 39 is moved circumferentially around the shaft 42 and retained in groove 63A by the tension on the lead from the winding machine.

Figure 6:
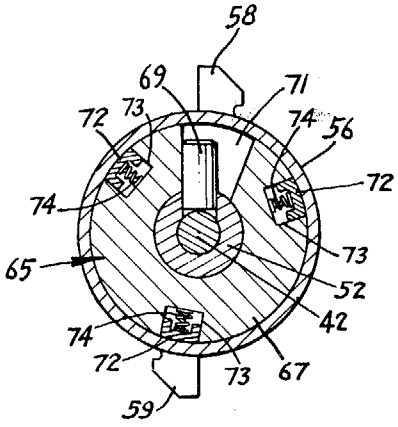
FIG. 6 is an enlarged sectional view taken along the line 6—6 of FIG. 2.
Figure 15:
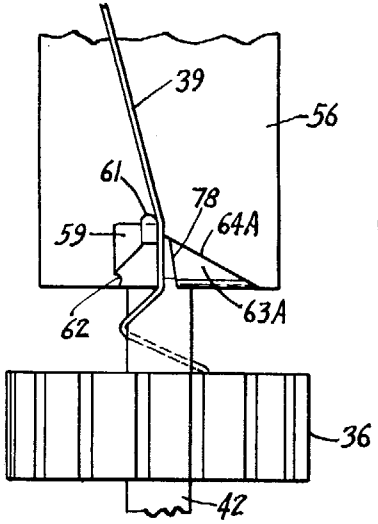
FIG. 15 is a fragmentary plan view taken along line 15—15 of FIG. 14.

FIGS. 23, 24 and 25 show outer sleeve 56 rotated in the clockwise direction with finger 59 moved upwardly along with the arm 111 of the drive control 109. FIG. 25 compares with FIG. 12. In this position arm 111 engages stop 117 thereby preventing further rotation of inner shaft 52. The inner cup member 65 continues to rotate with outer sleeve 56 by reason of the friction drive established by the shoes 72 as shown in FIG. 6 and the lost motion of slot 71 and pin 69. Cup member 65 continues to rotate with outer sleeve 56 until pin 69 engages the opposite wall of slot 71 as shown in FIGS. 7 and 26. Continued rotation of outer shaft 48 then moves outer sleeve 56 relative to cup member 65 until slot 78 is in alignment with groove 63A as shown in FIGS. 15, 16 and 27. In this position finger 59 has carried ending lead 39 approximately 180° around shaft 42. The tension on lead 39 maintained by the winding machine moves the lead forwardly into slot 78. The depth of slot 78 is sufficient to allow the lead to move to the far side of hook 43 of commutator 41. As shown in FIG. 16, lead 39 is in slot 78 and is positioned below and forwardly of the end of the hook.

Figure 17:
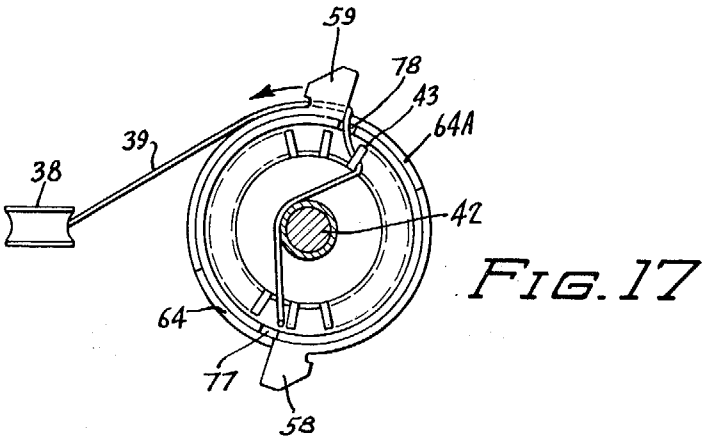
FIG. 17 is a sectional view similar to FIG. 10 showing how reverse rotation of the sleeves wraps the lead wire about the selected commutator hook.
Figure 14:
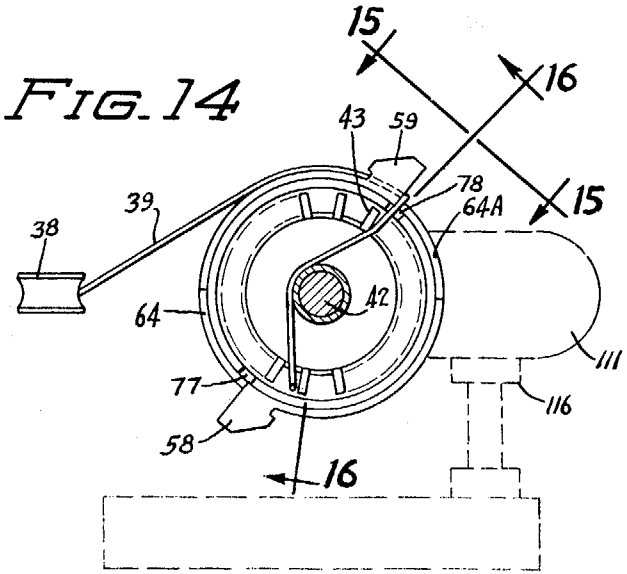
FIG. 14 is a sectional view similar to FIG. 10 showing the wire lead carried to the point at which it drops behind the selected commutator hook.

At this point arm 108 engages actuator 103 of switch 101 and thereby terminates the flow of pressure fluid into cylinder 84 and actuates a valve (not shown) by which the pressure fluid is directed to cylinder 86 thereby reversing the direction of rotation of outer shaft 48. As shown in FIGS. 27 and 28, arm 111 is held in engagement with stop 117 during the initial reverse movement of the shaft 48 by spring 116 interconnecting arm 111 with pin 113. In FIG. 27, slot 78 is adjacent the forward side of hook 43. On initial reverse rotation of outer sleeve 56 cup member 65 moves with sleeve 56 with slot 78 aligned with groove 63A carrying lead 39 under hook 43 as shown in FIG. 17. Slot 78 and groove 63A move together because of the lost motion of pin 69 in angular slot 71. Pin 69 holds cup member 65 from further reverse relative rotation with respect to inner shaft 52 thereby fixing the angular location of slot 78.

Figure 19:
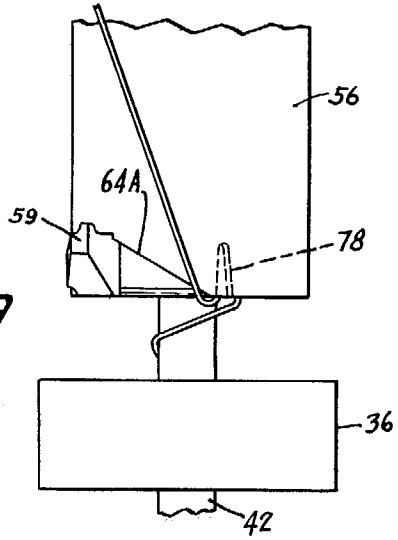
FIG. 19 is a plan view of the structure shown in FIG. 18.
Figure 18:
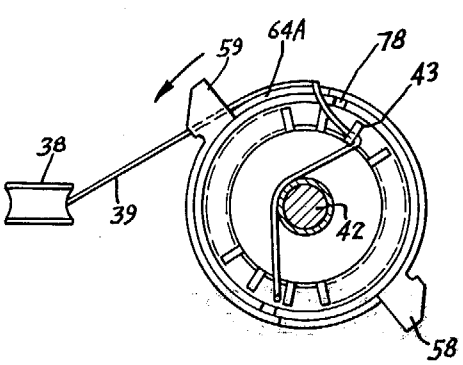
FIG. 18 is a sectional view similar to FIG. 10 showing how during relative rotation of the sleeves in the reverse direction the lead wire is disnegaged from the inner member.

The outer sleeve 56 continues to rotate because of its positive drive connection with outer shaft 48. Spring 116 holds arm 111 in engagement with stop 117 thereby preventing rotation of inner cup member 65. Sleeve 56 rotates in a reverse direction relative to cup member 65 since the force of spring 116 is greater than the friction drive of shoes 72 on sleeve 56. This relative rotation between the outer sleeve 56 and cup member 65 moves the inclined plowing edge or surface 64A across slot 78 forcing the wire lead 39 out of the slot and onto the end of sleeve 56 thereby moving the wire lead in a backward direction adjacent the rear side of hook 43. This completes the placement of the lead about hook 43 and places the hook in a shielding position within chamber 66. FIGS. 18 and 19 show how the plowing edge or surface 64A moves the wire lead 39 around hook 43 out of slot 78.

Figure 21:
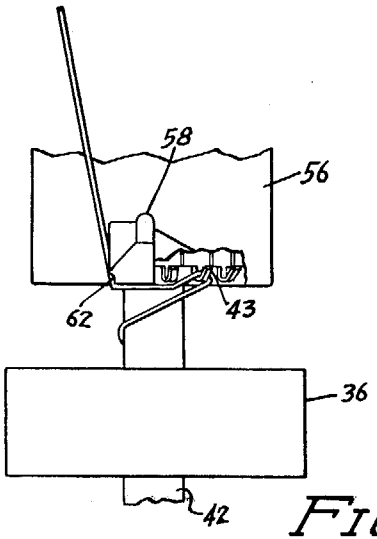
FIG. 21 is a plan view of the structure shown in FIG. 20 with parts broken away to show the lead wrapped around the hook.
Figure 20:
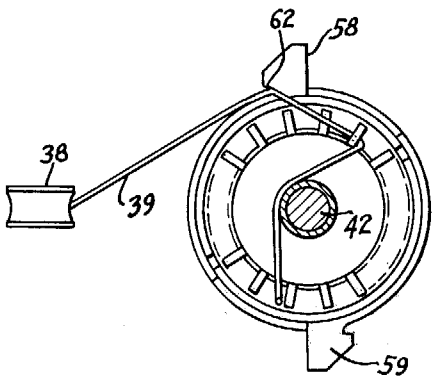
FIG. 20 is a sectional view similar to FIG. 10 showing the situation as it obtains preparatory to the indexing of the rotor for winding the next coil.
Figure 22:
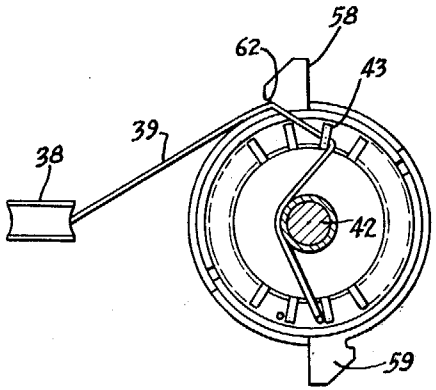
FIG. 22 is a sectional view similar to FIG. 20 showing the rotor indexed to the next coil receiving position.

As shown in FIG. 29, pin 113 is moved into engagement with arm 111 whereby the outer shaft 48 drives inner cup member 65 and sleeve 56 together back to their initial positions. As the sleeve 56 continues to rotate back to its initial position the opposite finger 58 engages lead 39 as shown in FIGS. 20 and 21. The lead is retained on the finger as it falls into recess 62 on the trailing side of the lug. As shown in FIG. 30, pin 113 is in contact with arm 111 establishing a positive drive connection between the outer shaft and the inner shaft. Cup member 65 is in frictional drive relationship with outer sleeve 56 since pin 69 engages the trailing side of slot 71. This location of pin 69 in slot 71 is maintained during the indexing of the rotor to the next position for receiving additional coils of wires as shown in FIG. 31. FIG. 22 shows the position of the trailing portion of the last wound coil lead located approximately 180° around shaft 42 and around commutator hook 43. The commutator has been indexed to the next position for receiving additional coils in adjacent pairs of slots. During the indexing of the rotor the fingers 58 and 59 are not rotated as the rotor shaft 42 is free to turn in bore 76.

Each succeeding terminating lead for each of the coils wound on the core is moved circumferentially around a portion of the shaft located between the core and the commutator and around the commutator hook from the far side in the manner described until the desired number of coils have been wound on the core. During the winding of any coil all of the leads already connected to commutator hooks are sheilded by the cup-shaped member 65. This prevents the leads from becoming unhooked from the commutator hooks and places all commutator hooks in a shielded position during the winding of additional coils on the core and during the movement of the ending leads about selected hooks.

In terms of a method of winding a rotor of an electrical machine having a slotted armature core and a commutator having circumferentially spaced hooks mounted on a shaft the invention comprises steps of shielding the commutator in a lead moving and guiding unit. With the commutator shielded one or more coils of wire are placed in separate circumferentially spaced slots of the slotted core. When the coils are completed the terminating leads which extend from the slots are located adjacent to the shielded commutator in engagement with the lead moving and guiding unit. The terminating lead of each coil is carried circumferentially around the shaft carrying the core by rotation of the lead moving and guiding unit. This places the lead extended from the core close to the shaft and eliminates bridging of successively applied leads. The leads are then placed about selected hooks with all hooks except the selected hooks remaining shielded. This is done by moving the leads in axial directions away from the core adjacent the far or forward side of the selected commutator hooks. The leads are then carried a short distance back in a circumferential direction under the selected hooks, and then moved in axial directions toward the core adjacent the rear side of the hooks thereby placing the leads around the selected commutator hooks. The selected hooks are only unshielded during the time the leads are carried circumferentially back to locate the leads under the hooks.

Those skilled in the art will appreciate that the invention can be embodied in forms other than as herein disclosed for purposes of illustration.

The invention is defined by the following claims:

1. A method of winding an armature having a core with circumferentially spaced coil-receiving slots, a commutator having segments with lead-receiving hooks to which leads from coils that are wound into pairs of the slots are attached, and a shaft on which the core and the commutator are mounted in axially spaced relation, said method comprising the steps of:

A. shielding the entire commutator by inserting the same into an open end portion of the inner one of a pair of concentric sleeve members that are rotatable together and with respect to one another;

B. winding a coil in a pair of circumferentially spaced slots of the armature core while the commutator is thus shielded;

C. upon completion of the coil; holding the ending lead thereof taut and alongside the portion of the armature shaft between the core and the commutator and adjacent to the shielded commutator;

D. by rotation of the outer sleeve member in one direction, moving said lead circumferentially about the axis of the armature into tangential engagement with said portion of the armature shaft and into juxtaposition to a selected commutator hook that is circumferentially spaced from the coil slot from which the lead emanates;

E. by relative rotation between the sleeve members, exposing only the selected hook and placing the lead in position to be engaged with said hook;

F. by rotation together and relative to one another of both sleeve members in the opposite direction, completing engagement of the lead with the hook, reshielding said hook, moving the lead which now extends from said hook [circumferentially about the axis of the armature] into position to enter directly into the first of the next pair of coil-receiving slots;

G. with all of the hooks of the commutator again shielded and with the armature indexed to bring said next pair of slots into winding position, placing the lead directly into the first of said pair of slots to begin the next coil and completing the winding of said next coil; and H. repeating the aforesaid steps until all coil-receiving slots have had coils wound into them.

2. The method of claim 1, wherein the lead is moved circumferentially around the axis of the armature between 90° and 270° from the coil slot from which it emanates in being brought into juxtaposition to the selected commutator hook.

3. The method of claim 1, wherein during the first movement of the lead circumferentially about the axis of the armature, the lead is placed adjacent to one side of the selected hook, and wherein during the second movement of the lead [circumferentially about the axis of the armature], the lead is carried under and placed at the opposite side of the selected hook, said selected hook being unshielded only during the time the lead is carried under said hook.

4. The method of claim 1, wherein a pair of coils are simultaneously wound in two pairs of coil slots, and wherein the ending leads from the two coils are simultaneously engaged with selected commutator hooks, while all of the other hooks remain shielded.

[5. In the winding of an armature having a core circumferentially spaced slots, into pairs of which coils are successively wound, a commutator having segments with hooks onto which leads from the coils are attached, and a shaft on which the core and the commutator are mounted in axially spaced relation, the improvement by which crossover loops and undesirable bridging of leads of are eliminated and which improvement is achieved by:

A. shielding the commutator hooks;

B. with the commutator hooks shielded, winding a coil of wire into a pair of circumferentially spaced core slots;

C. upon completion of the coil, holding the ending lead of the coil taut and alongside the portion of the armature shaft between the core and commutator;

D. effecting relative motion between the tautly held lead and the armature about the axis of the armature to bring the lead into tangential engagement with said portion of the shaft;

E. with the tautly held lead bearing tangentially against said portion of the shaft, rendering accessible a selected commutator hook that is circumferentially spaced from the coil slot from which the lead emanates and effecting relative motion between the lead and the armature to produce engagement of the lead with said selected hook, F. reshielding the selected commutator hook;

G. again effecting relative motion between the tautly held lead and the armature about the axis of the armature to thereby engage the lead around the selected commutator hook;

H. with the armature indexed to dispose the pair of slots into which the next coil is to be wound in winding position, carrying the lead directly into the first of said pair of slots with said stretch of the lead that extends from the engaged commutator hook bearing tangentially against said portion of the armature shaft, and resuming the winding operation; and I. repeating the aforesaid steps until all of the core slots have coils wound therein.]

[6. In the winding of an armature, the improvement set forth in claim 5, wherein said relative motion between the tautly held lead and the armature is pr duced by impartingg motion to the tautly held lea while the armature remains stationary.]

[7. The method of claim 6, wherein during said fir relative motion, the tautly held lead is moved in one d rection around the axis of the armature beyond the se lected commutator hook so that the lead engages be hind the hook, and wherein said second relative motion is in the revers direction to carry the lead around the hook.]

[8. The method of the claim 6, wherein the shield ing of the commutator hooks is done by placing the en tire commutator in a cup-shaped chamber, and wherein the relative motion between the tautly hel lead and the armature is effected by establishing connection between the lead and the side of sai chamber and rotating the chamber around the commutator.]

* * * * *